United States Patent
Reece

[11] 3,910,227
[45] Oct. 7, 1975

[54] HAND BREADER
[76] Inventor: Vernon E. Reece, 1936 W. 47 Place, Tulsa, Okla. 74125
[22] Filed: Nov. 23, 1973
[21] Appl. No.: 418,680

[52] U.S. Cl. .................... 118/29; 118/31; 118/501; 209/342
[51] Int. Cl.² .......................................... B05C 3/02
[58] Field of Search .......... 118/29, 16, 26, 31, 501; 209/303, 304, 342, 337

[56] References Cited
UNITED STATES PATENTS

| | | | |
|---|---|---|---|
| 1,783,127 | 11/1930 | McCormick | 209/244 |
| 3,129,167 | 4/1964 | Frangos | 209/342 |
| 3,520,277 | 7/1970 | Gordon | 118/26 |
| R27,449 | 8/1972 | Bartz | 220/1 |

Primary Examiner—Mervin Stein
Assistant Examiner—Douglas Salser

[57] ABSTRACT

An apparatus for the hand breading of foods and having a batter pan, a flour pan, a sifter, and a catch pan mounted on a common support structure. The flour pan is disposed above and in substantial alignment with the sifter and is provided with a bottom wall tapered toward an opening disposed above the sifter for discharging used flour into the sifter subsequent to breading of the food. The sifter is disposed above and in substantial alignment with the catcher pan whereby reusable flour is sifted from the used flour and deposited in the catch pan for recycling in the breading operation. Power means is also provided on the support structure and operably connected with the sifter for actuation thereof.

6 Claims, 5 Drawing Figures

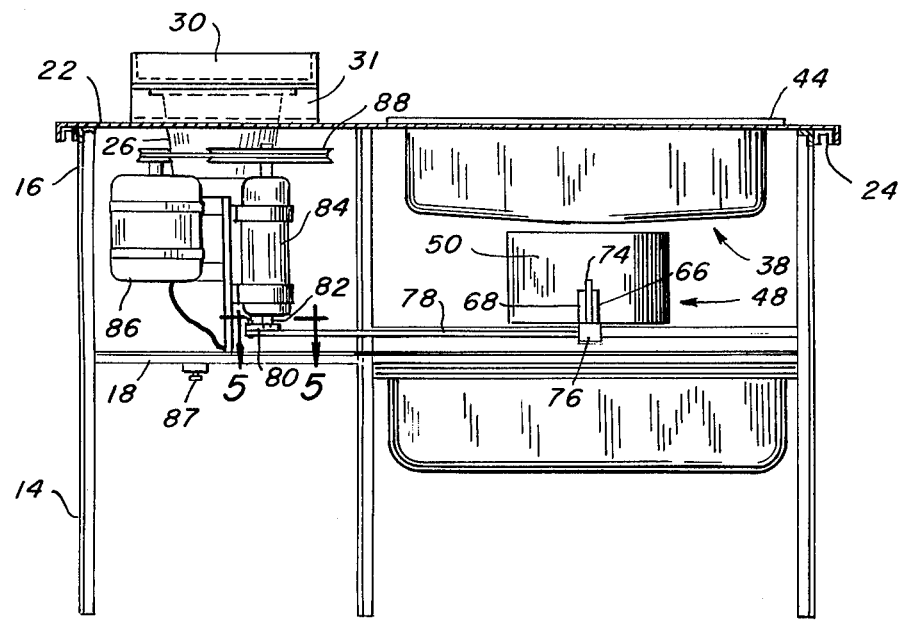
FIG. 3
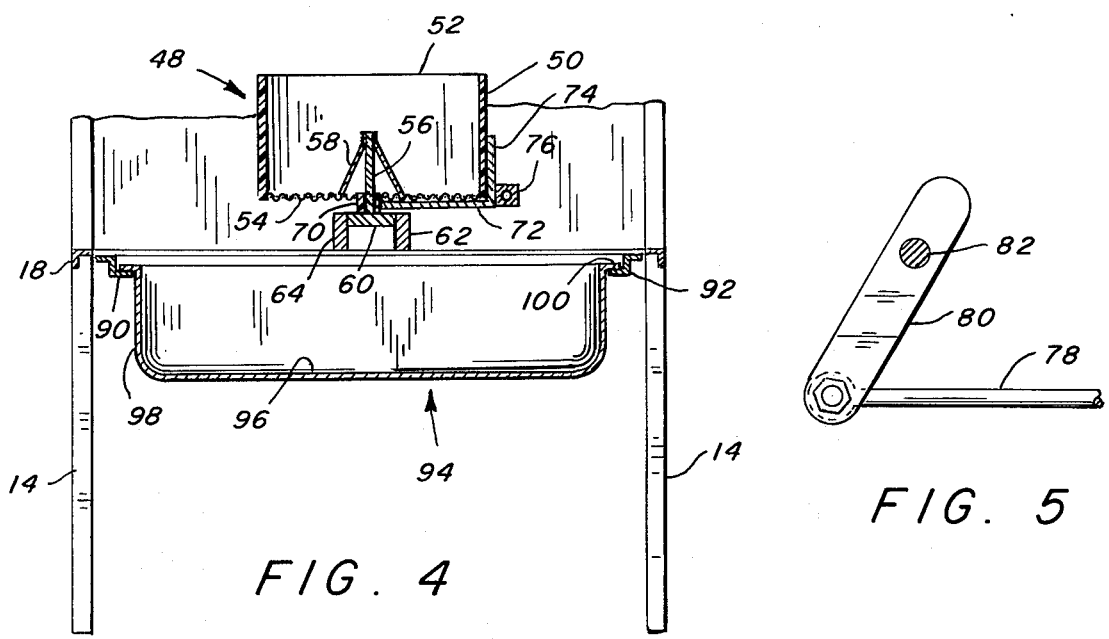
FIG. 4
FIG. 5

HAND BREADER

BACKGROUND OF THE INVENTION

1. Field of the Invention

This invention relates to improvements in breading devices and more particularly, but not by way of limitation, to a hand breading device for sifting the used flour subsequent to a breading operation for reclaiming reusable portions thereof.

2. Description of the Prior Art

In many eating establishments foods, such as chicken pieces, shrimp, or other food to be deep fried, are breaded by hand prior to the cooking thereof. The food is usually drenched in a suitable liquid or batter and then rolled or otherwise covered with a flour mixture for a breading or coating of the food. The flour mixture frequently becomes unsuitable for further use in that moisture from the liquid covering or batter covering causes some of the flour to form in masses or clods which resist adhering to the foods being breaded. Of course, much of the flour remains reusable, but the heterogeneous mixture per se become substantially unsuitable for continued use in the breading process. Considering that the ingredients of the breading mixture are expensive, it is extremely desirable to separate the usable flour portion from the mixture for reuse in subsequent breading procedures.

SUMMARY OF THE INVENTION

The present invention contemplates a novel hand breader apparatus particularly designed and constructed for efficiently sifting the flour mixture subsequent to use thereof for a breading operation and catching that portion thereof which is reusable for further breading operation. The novel apparatus comprises a main support structure having a work table or working surface for supporting a batter pan and flour pan at a convenient height for the person performing the hand breading operation. The batter pan comprises a relatively deep batter holding portion having a surface conterminous with its open upper end which may be conveniently used for placing food pieces thereon during the application of the batter thereto. The surface is tapered in a direction toward the open end of the holding portion wherein gravity may assist in directing any spilled batter, or the like, back into the holder portion. The flour pan is provided with a covered opening in the bottom thereof, said bottom being tapered toward the opening for facilitating movement of the flour mixture toward the opening by gravity. The food pieces are initially hand dipped into the batter or the like contained in the batter pan for providing a moist covering on the outer periphery of the individual food pieces. The batter covered food pieces are then placed in the flour mixture contained within the flour pan, and the food pieces are manually handled in the usual manner for a dredging of the pieces with the flour mixture, assuring an efficient and complete covering of each food piece. The food pieces thus breaded may be deep fried, or otherwise cooked to provide the finished edible product.

Subsequent to the breading of a multiplicity of food pieces, the flour mixture usually becomes a heterogeneous composition of loose flour and clotted flour, and the covering of the food pieces with the flour mixture may be less efficient than desired. When this condition occurs, the opening in the bottom of the flour pan may be uncovered, whereupon the flour mixture may flow downwardly through the opening and into a sifter provided in the support structure and disposed below the flour pan. The tapered configuration of the bottom of the flour pan facilitates the discharging of the flour mixture therefrom through the opening.

The sifter comprises a hopper element disposed in substantial alignment with the opening of the flour pan for receiving the used flour mixture therefrom. The bottom of the hopper is open and covered by a suitable grid or mesh member having agitating elements cooperating therewith for sifting the flour mixture as it drops by gravity through the mesh or screen member and into a catch pan which is removably disposed on the support structure below the sifter. The usable portions of the flour mixture will be retained in the sifter above the screen member, and the relatively loose reusable portions of the flour mixture will be sifted and dropped by gravity into the catch pan. The catch pan may then be manually removed from its position below the sifter, and the quantity of flour mixture deposited therein may be transferred to the flour pan for reuse.

The sifter is operably connected with a power source, such as an electric motor, whereby agitation of the sifter is mechanically achieved during a sifting operation. Of course, the motor may be selectively activated in order to provide the sifting action only when desired. The novel hand breader apparatus is simple and efficient in operation and economical and durable in construction.

BRIEF DESCRIPTION OF THE DRAWINGS

FIG. 3 is a view taken on line 3—3 of FIG. 1.

FIG. 4 is a view taken on line 4—4 of FIG. 2.

FIG. 5 is a view taken on line 5—5 of FIG. 3.

DESCRIPTION OF THE PREFERRED EMBODIMENT

Figure 1:
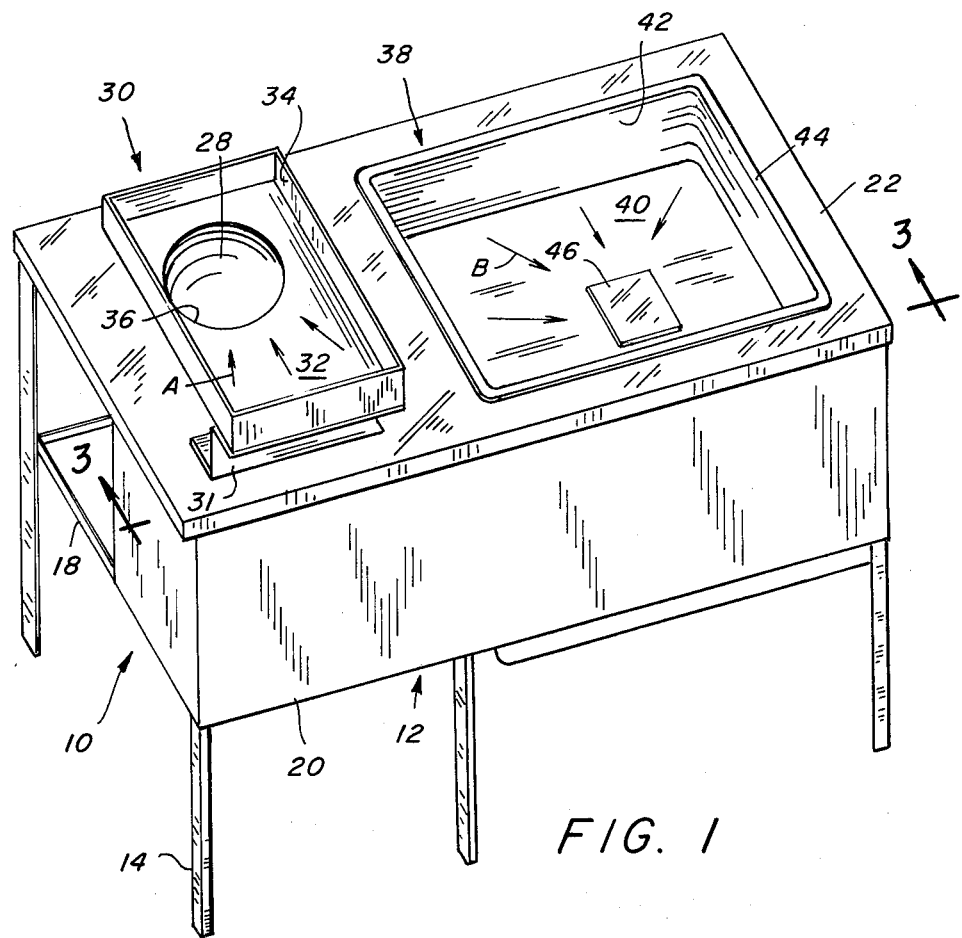
FIG. 1 is a perspective view of a hand breader apparatus embodying the invention.

Referring to the drawings in detail, reference character 10 generally indicates a hand breader apparatus comprising a support structure 12 having a plurality of vertically disposed spaced leg members 14 supporting an upper open frame 16 (FIG. 3) and an open frame 18 spaced therebelow. Suitable sidewalls 20 may be provided between the outer periphery of the frames 16 and 18 for encasing a portion of the structure 12, if desired, and as particularly shown in FIG. 1. A substantially flat top member 22 is removably secured to the upper frame 16 in any well known manner, such as by a plurality of bracket or clip members 24, and provides a working surface disposed at a convenient working height for the breading operation.

The top 22 is provided with a first aperature (not shown) for removably receiving a suitable batter pan 26 therein. The upper end of the batter pan 26 is preferably spaced above the outer surface of the top 22 and is shown at 28 in FIG. 1. A drip tray member 30 is disposed in the proximity of the upper end of the batter pan 26, and is preferably supported in cantilever fashion above the top 22 by a suitable bracket 31. The tray 30 preferably comprises a bottom 32 having sidewall 34 extending outwardly from the outer periphery thereof as is well known. An aperture 36 is provided in the bottom 32 for diposition in alignment with the open end 28 of the pan 26, or for receiving the upper end of the pan 36 therethrough. The bottom 32 of the tray 30 is tapered in a direction toward the aperature 36 as indicated by the arrows A in FIG. 1 for a purpose as will be hereinafter set forth. Of course, the tray 30 is preferably removably supported on the bracket 31, and it is preferably that the upper surface of the bottom 32 be substantially flush with the open end 28 of the batter pan 26, but not limited thereto.

A second aperature (not shown) is provided in the top member 22 for removably receiving a flour pan 38 therein. The flour pan 38 as shown herein comprises a bottom plate 40 having sidewalls 42 extending outwardly around the outer periphery thereof. In addition, an outwardly directed flange 44 extends around the outer edges of the sidewalls 42 for engaging the top 22 surrounding the second aperture for supporting the flour pan 38 therein. An opening (not shown) having a suitable plug 46 removably disposed therein is provided in the bottom 40 of the pan 38. The plugger opening is disposed above and in substantial alignment with a sifter apparatus generally indicated at 48. The bottom 40 is tapered toward the aperture as indicated by the arrows.

The shifter apparatus as shown herein comprises a cylindrical housing 50 having one end thereof open as shown at 52, and the opposite end thereof closed by a suitable screen 54, or the like. A centrally disposed rod 56 (FIG. 4) extends through an aperature (not shown) provided in the screen 54 and into the interior of the cylindrical housing 50 for supporting an inverted conical element 58 therein for a purpose as will be hereinafter set forth. The rod 56 is supported by a frame or plate member 60 which is suitably secured to a pair of spaced cross members 62 and 64. The cross members 62 and 64 are secured to the frame 18 in any suitably manner (not shown). A plurality of circumferentially spaced pairs of spaced stop members 66 and 68 are rigidly secured to the outer periphery of the cylindrical housing 50 and are mutually parallel and in substantial alignment with the longitudinal axis of the housing 50.

A bushing 70 is disposed around the rod 56 and supported by the frame or plate member 60, and a plurality of radially outwardly extending arms 72 are suitably secured to the outer periphery of the bushing 70. The arms 72 extend across the outer surface of the screen, spaced slightly therefrom, and terminate in perpendicularly arranged rods 74, each rod 74 being adapted to be removably disposed between the associated stops 66 and 68. For example, as shown herein, three sets of the stops 66 and 68 are spaced around the outer periphery of the cylindrical housing 50 at substantially one hundred twenty degrees apart. Similarly, three of the arms 72 are provided spaced approximately one hundred twenty degrees apart and each in substantial alignment with a respective pair of the stop members 66 and 68. Thus, the housing 50 may be removably secured in position beneath the flour pan 38 by vertically placing the cylindrical housing centrally between the upstanding rods in such a manner that the rods 74 slide into position between the respective stop members 66 and 68.

Figure 2:
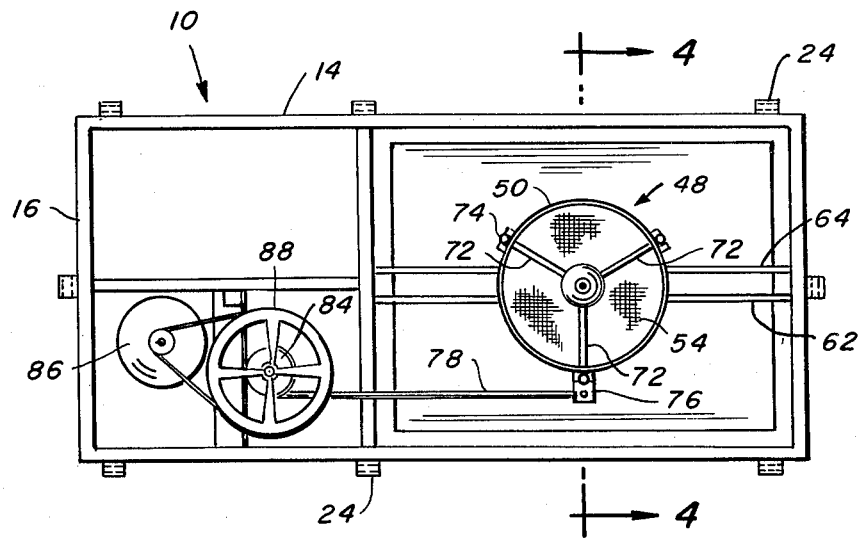
FIG. 2 is a top view of a hand breader apparatus embodying the invention with the top member thereof removed for purposes of illustration.

A block member 76 is suitably secured to the rod 74 of one of the arms 72, as clearly shown in FIGS. 2 and 4. A first crank arm 78 has one end pivotally secured to the block 76 and the opposite end thereof pivotally secured to one end of a second crank arm 80. The arm 80 is secured to the drive shaft 82 of a suitable power take-off or speed reducer 84 which is operably connected with a motor 86 in any suitable manner, such as by sprocket or pulley and belt generally indicated at 88. A suitable on-off switch 87 is operably connected with the motor 86 for selective activation thereof and may be conveniently mounted on the frame 18 as shown in FIG. 3. Upon rotation of the shaft 82 about its own longitudinal axis, the crank arm 80 is rotated simultaneously therewith, pulling the crank arm 78 therewith to transmit a rocking motion to the cylindrical housing 50, thus providing a shaker means for oscillating the housing 50 about its own longitudinal axis. This provides a shaking action for the sifter apparatus 48.

A pair of mutually parallel guide rails 90 and 92 (FIG. 4) are welded or otherwise secured to the frame 18 or between adjacent pairs of the legs 14 and are spaced below the sifter 48 for removably supporting a catch pan 94 in substantial alignment with the sifter 48. The pan 94 as shown herein comprises a bottom plate 96 having outwardly extending sidewalls 98 provided around the outer periphery thereof. An outwardly extending flange 100 is provided around the outer edge of the sidewalls 98 for slidable engagement with the guide rails 90 and 92 in order to removably retain the pan 94 in position below the sifter 48.

In operation, the apparatus 10 is assembled as shown in the drawings, with the batter pan 26 and tray 30 being placed in the proper position in the top 22, and the catch pan 94, sifter 48 and flour pan 38 disposed in substantial longitudinal alignment, said sifter 48 being disposed beneath the flour pan 38, and the catch pan 94 being disposed beneath the sifter. The batter, or other coating liquid (not shown) is placed in the batter pan 26, and the flour mixture (not shown) which may be of any desired type including seasonings and the like if desired, is placed in the flour pan. Any food pieces to be breaded may be hand dipped in any well known manner. The batter coated food pieces are removed from the batter pan 26 and transferred to the flour pan 38 where they may be dredged in the flour mixture sufficiently for providing a thorough coating on the food pieces. The coated food pieces may then be transferred from the apparatus 10 for the cooking thereof as is well known.

It will be readily apparent that some of the batter will fall or drip from the batter coated food pieces as they are lifted from the batter pan 26 for transfer to the flour pan 38. These drippings will be caught in the tray 30, and the tapered or angular configuration of the bottom plate 32 thereof will cause the drippings to roll or flow toward the open end 28 of the batter pan 26 for being recycled into the batter pan.

It will also be apparent that portions of the flour mixture may become dampened by dripping batter and form clots in the mixture or small and/or broken pieces of the food may drop into the flour mixture during the dredging operation. When a sufficient quantity of the flour mixture becomes so clotted, it may be difficult to efficiently dredge the food pieces in the flour mixture. However, in this event, there is usually a great quantity of the flour mixture which is still of a usable nature, and it is desirable to retrieve this usable portion of the flour mixture for recycling thereof into the flour pan.

In order to separate the usable portion of the flour mixture from the unusable portion thereof, the plug 46 may be removed from the opening in the bottom 40 of the flour pan 38, and the switch 87 may be moved to the "on" position therefor to activate the motor 86 for transmitting movement to the crank arms 80 and 78. As the arm 80 is rotated about the axis of the drive shaft 82, the arm 78 transmits an oscillatory movement to the block 76. The oscillatory movement of the block 76 is transmitted to the cylindrical housing 50 by the engagement between the rod 74 and respective stops 66 and 68. This oscillatory movement of the housing 50 causes a shaking action for sifting the flour dropping from the opening in the flour pan 38. A portion of the flour mixture entering the housing 50 will impinge upon the conical member 58 and be directed radially outwardly toward the outer portions of the screens 54 to assure an efficient sifting of the mixture. This is important since the center of the screen 54 is a substantially "dead area" with respect to the shaking action, and the conical member 58 assures that the flour mixture will not accumulate in the center of the housing 50.

The flour mixture sifted through the screen 54 drops by gravity into the catch pan 94. Only the reusable portions of the flour mixture will be passed through the screen 54 for deposit in the catch pan since the screen 54 is of a size for precluding passage of clots, or the like, therethrough.

When the flour mixture has been transferred into the catch pan 94 as hereinbefore set forth, the plug 46 may be reinserted in the opening of the flour pan 38 and the switch 87 may be actuated for stopping the operation of the motor 86. The catch pan 94 may be removed from its position beneath the sifter 48 and the contents of the catch pan may be deposited in the flour pan for reuse.

Of course, the batter pan 26, tray 30, flour pan 38, sifter 48 and catch pan 94 may all be removed for cleaning thereof. The flour pan 38 may be easily removed from its aperture in the top 22, thus providing access to the sifter 48. The sifter 48 may be removed by vertically lifting the housing 50 and disengaging the stop members 66 and 68 from the respective rods 74. The catch pan 94 may be slidably removed from the guide rails 90 and 92. When the breading operation is to be repeated, the cleaned elements may be reinstalled on the support structure 12 as hereinbefore set forth.

From the foregoing it will be apparent that the present invention provides a novel hand breader apparatus comprising a basic support structure having a batter pan and catch tray removably disposed thereon wherein food pieces may be hand dipped or the like for coating of the food pieces with the batter or liquid. A flour pan is removably disposed on the support structure for housing a flour mixture and the batter coated food pieces may be dredged in the flour mixture for providing the desired breaded type coating therefor. The used flour mixture may be removed from the flour pan by gravity for passage through a sifter wherein only the reusable portions of the flour mixture are transmitted to a catch pan. The catch pan and sifter are removably disposed on the support structure in substantial alignment with the flour pan and spaced therebelow for catching the flour mixture being discharged from the flour pan. The flour mixture deposited in the catch pan may be returned to the flour pan for reuse. The novel hand breader apparatus is simple and efficient in operation and economical and durable in construction.

Whereas the present invention has been described in particular relation to the drawings attached hereto, it should be understood that other and further modifications apart from those shown or suggested herein may be made within the spirit and scope of this invention.

What is claimed is:

1. A hand breader apparatus comprising a support structure, an apertured top member removably secured on the support structure, batter pan means removably disposed in one of the apertures of the top member, drip tray means removably supported on the top member and having an aperture provided in the bottom thereof in substantial alignment with the batter pan means, flour pan means removably disposed in a second aperture of the top member and having an aperture in the bottom thereof, plug means cooperating with the last mentioned aperture for opening and closing thereof for selectively discharging the contents of the flour pan through the said last mentioned aperture, sifter means removably disposed on the support structure in substantial alignment with said last mentioned aperture, said sifter means being disposed below the bottom of the flour pan means for receiving the discharging contents therefrom, catch pan means removably disposed on the support structure in substantial alignment with the sifter means and disposed therebelow for receiving the contents from the sifter means, shaker means operably connected with said sifter means for shaking thereof to sift the contents therein for discharge of the reusable portion of the contents to the catch pan means, said shaker means including powered crank arm means, radially extending arm means rotatably secured below and extending across the sifter means and operably connected between the crank arm means and sifter means for transmitting oscillation to the sifter means.

2. A hand breader as set forth in claim 1 wherein the sifter means comprises a cylindrical housing disposed in substantial alignment with the aperture of the flour pan bottom and having one open end for receiving the contents from the flour pan therethrough and the opposite end closed by screen means for selectively passing portions of the contents therethrough upon actuation of the shaker means.

3. A hand breader as set forth in claim 1 including guide means cooperating between the crank arm means and sifter means for facilitating removal and installation of the sifter means on the support structure.

4. A hand breader comprising a support structure, an apertured top member removably secured on the support structure, a batter pan removably disposed in one of the apertures of the top member and having one end thereof open and extending slightly above the outer surface of the top member, a drip tray member removably supported on the top member and having an apertured bottom in open communication with the open end of the batter pan, said bottom being tapered in a direction toward the aperture therein for facilitating recycling of any dropped batter into the batter pan, a flour pan removably disposed in a second aperture of the top member and having an aperture in the bottom thereof, a removable plug member provided for the last mentioned aperture for opening and closing thereof, said flour pan bottom being tapered in a direction toward the aperture therein for facilitating discharging of the contents of the flour pan through the aperture when open, a rotatable sifter member disposed on the support structure below the flour pan and having one open end disposed beneath and substantially in alignment with the flour pan aperture for receiving the contents therefrom, said sifter member having the opposite end thereof closed by a screen member, a conical member substantially centrally disposed with respect to said screen member for directing the contents radially toward the outer portions of the screen member, a plurality of radially extending arm members disposed beneath the screen member, each arm terminating in a perpendicular rod member extending in a direction toward the flour pan, guide bar means provided on the outer periphery of the sifter member for slidably receiving the rod members therein to facilitate removal from and installation of the sifter member on the support structure, said arm members being carried by a bushing member, a first crank arm pivotally secured to at least one of said rods, a second crank arm having one end pivotally secured to the first crank arm, said second crank arm being operably connected with a power source for transmitting oscillation to the sifter member through the first crank arm upon actuation of the power means for sifting only reusable portions of the contents through the screen member and a catch pan removably disposed on the support structure below the sifter member for receiving the reusable contents therefrom for recycling of the reusable contents.

5. A hand breader apparatus comprising a support structure, an apertured top member removably secured on the support structure, batter pan means removably disposed in one of the apertures of the top member, drip tray means removably supported on the top member and having an aperture provided in the bottom thereof in substantial alignment with the batter pan means, flour pan means removably disposed in a second aperture of the top member and having an aperture in the bottom thereof, plug means coooerating with the last mentioned aperture for opening and closing thereof for selectively discharging the contents of the flour pan through the said last mentioned aperture, sifter means removably disposed on the support structure in substantial alignment with said last mentioned aperture, said sifter means being disposed below the bottom of the flour pan means for receiving the discharging contents therefrom, catch pan means removably disposed on the support structure in substantial alignment with the sifter means and disposed therebelow for receiving the contents from the sifter means, shaker means operably connected with the sifter means for shaking thereof to sift the contents therein for discharge of the reusable portion of the contents into the catch pan means, said sifter means comprising a cylindrical housing disposed in substantial alignment with the aperture of the flour pan bottom and having one open end for receiving the contents from the flour pan therethrough and the opposite end closed by screen means for selectively passing portions of the contents therethrough upon actuation of the shaker means, and including centrally disposed conical means provided in said cylindrical housing for facilitating the distribution of the contents on the screen means.

6. A hand breader apparatus comprising a support structure, an apertured top member removably secured on the support structure, batter pan means removably disposed in one of the apertures of the top member, drip tray means removably supported on the top member and having an aperture provided in the bottom thereof in substantial alignment with the batter pan means, flour pan means removably disposed in a second aperture of the top member and having an aperture in the bottom thereof, plug means cooperating with the last mentioned aperture for opening and closing thereof for selectively discharging the contents of the flour pan through the said last mentioned aperture, sifter means removably disposed on the support structure in substantial alignment with said last mentioned aperture, said sifter means being disposed below the bottom of the flour pan means for receiving the discharging contents therefrom, catch pan means removably disposed on the support structure in substantial alignment with the sifter means and disposed therebelow for receiving the contents from the sifter means, and shaker means operably connected with the sifter means for shaking thereof to sift the contents therein for discharge of the reusable portion of the contents to the catch pan means, said shaker means comprising power means, crank arm means operably connected between the power means and the sifter means for transmitting oscillation to the sifter means upon actuation of the power means, guide means cooperating between the crank arm means and sifter means for facilitating removal and installation of the sifter means on the support structure, said guide means comprising bushing means connected to said crank arm means, a plurality of radially outwardly extending arm members carried by the bushing means, each of said arm members being provided with a perpendicularly arranged rod at its outer end and a plurality of circumferentially spaced sets of spaced guide bars provided on the sifter means, each set slidaly receiving a rod therein.

* * * * *